July 9, 1968    A. BRUEDER    3,391,761
VIBRATION PREVENTING MEANS FOR A DISC BRAKE
Filed Sept. 27, 1966

July 9, 1968

A. BRUEDER 3,391,761

VIBRATION PREVENTING MEANS FOR A DISC BRAKE

Filed Sept. 27, 1966

United States Patent Office 3,391,761
Patented July 9, 1968

3,391,761
VIBRATION PREVENTING MEANS FOR A
DISC BRAKE
Antoine Brueder, Paris, France, assignor to Société
Anonyme Andre Citroen, Paris, France
Filed Sept. 27, 1966, Ser. No. 582,436
Claims priority, application France, Oct. 6, 1965,
33,951
3 Claims. (Cl. 188—73)

ABSTRACT OF THE DISCLOSURE

The disc brake includes a spring leaf, interposed between the stationary frame of the brake and the friction structure, which is movable with respect to the frame, to prevent vibration of the friction structure. The spring makes three-point contact with the frame to hold the spring in place even in the absence of the friction structure.

In United States Patent No. 3,285,371 entitled "Spot Type Disc Brakes," (application Ser. No. 423,697, filed by Jean Cadiou on Jan. 6, 1965) has been disclosed disc brakes including a disc driven in rotation by a shaft to be braked, a brake frame disposed astride of a portion only of the periphery of said disc, two friction pads mounted on said frame on opposite sides respectively of the disc in such manner that at least one of them can slide with respect to said frame in a direction parallel to said shaft, and means for displacing said movable friction pad, or pads, with respect to the frame in the direction which tends to clamp the disc between the two friction pads.

The present invention relates to improvements in such brakes more especially wherein the disc and the frame are both fixed in the direction parallel to said shaft and the pads are both movable and actuated separately by said means.

In the brakes according to said prior patent there is provided, on at least one of the pads (and/or on the rigid plate carring said pad) two cylindrical bearing surfaces having a common axis parallel to the axis of said shaft and having circular arcs as directrices and, on the frame, on the one hand, cylindrical holding surfaces intended to cooperate respectively with said bearing surfaces, and of the same radii as them whereby the friction pad that is considered can pivot a limited angle about said common axis, and, on the other hand, at least one abutment normally preventing such a pivoting movement, this abutment being retractable so that, once retracted, it permits said pivoting movement until one of the bearing surfaces of the pad, and/or of its plate, escapes from the frame holding surface and thus enables the pad to be removed by displacement parallel to the corresponding face of the disc and away from the other holding surface of the frame.

Another improvement in disc brakes disclosed in said prior patent consists in providing, on every friction pad or on the plate associated therewith, a concave bearing surface and a convex bearing surface and in giving corresponding shapes to the holding surfaces of the frame, the convex holding surface being possibly constituted by a rod secured to the frame.

The object of the present invention is to provide an improvement in disc brakes made according to said prior patent.

This last mentioned improvement consists in the fact that the, or each, movable friction pad is applied against its holding abutment surfaces by means of a spring leaf of dimensions sufficient to permit displacements of the pad due to its wear, this spring leaf advantageously bearing on said rod.

A preferred embodiment of the present invention will be hereinafter described with reference to the appended drawings, given merely by way of example, and in which.

Figure 1:
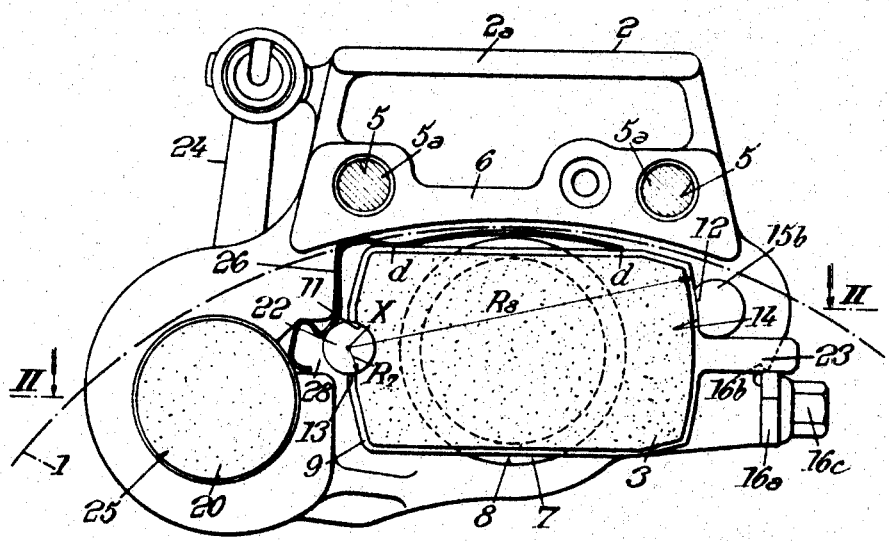
FIG. 1 is a vertical section on the line I—I of FIG. 2 of a brake according to the present invention.
Figure 2:
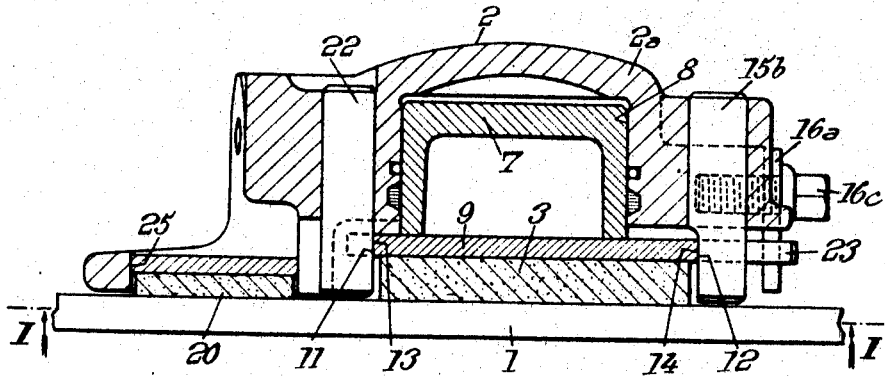
FIG. 2 is a horizontal half section on the line II—II of FIG. 1.

The brake includes the following elements:
A disc 1 driven in rotation by a shaft (not shown) to be braked;
A brake frame 2 disposed astride of a portion only of the periphery of disc 1;
Two friction pads 3 mounted in frame 2, on opposite sides of disc 1, respectively, in such manner that at least one of them can slide in this frame in a direction parallel to the shaft on which disc 1 is mounted; and
Means for displacing the movable pad or pads with respect to frame 2 in the direction for which disc 1 is clamped between pads 3.

In the following description it will be supposed that disc 1 and frame 2 are both fixed in a direction parallel to the shaft of the disc and that both of the pads 3 are movable and separately actuated by the above mentioned means.

Frame 2 consists of two elements 2a and 2b assembled together along a plane corresponding approximately to the means plane of disc 1. These two frame elements are secured to each other by means of bolts 5a extending through holes provided in elements 2a and 2b on the outside of the outline of disc 1. This frame 2 has a C-shaped profile so that the middle portion of the C-profile prevents access to the pads in the radial direction of the disc. In the embodiment shown by the drawings, where frame 2 is made of two elements 2a and 2b, wall portion 6, along which said elements are assembled together and the inner portion of which is close to the periphery of disc 1, forms an obstacle for pads 3.

In order to actuate the pads, use is made of hydraulic or pneumatic means consisting of pistons 7 slidable in cylinders 8 carried by frame 2 and into which a fluid under pressure can be fed simultaneously. Said hydraulic or pneumatic means may be completed or replaced by mechanical means (not shown).

Rigid plates 9 which carry pads 3 are provided with respective cylindrical bearing surfaces 11 and 12 having a common axis X parallel to the axis of disc 1 and having as directrices circular arcs. Frame 2 carries, on the one hand, holding surfaces 13 and 14 intended to cooperate with bearing surfaces 11 and 12 respectively, whereby the pads can pivot over a limited angle about axis X, and, on the other hand, at least one abutment normally preventing this pivoting movement.

Bearing surface 11 is concave and bearing surface 12 is convex, holding surfaces 13 and 14 having corresponding shapes. Holding surface 13 is the surface of a rod 22 extending through element 2a (or 2b) and projecting to the inside of the periphery of disc 1. Radius $R_7$ common to surfaces 11 and 13 is substantially smaller than radius $R_8$ common to surfaces 12 and 14. In order to prevent the pivoting of the pads about axis X, there is provided, on either side of a tongue 23 belonging to plate 9, a fixed abutment, consisting of a rod 15b carried by element 2a or 2b, and a retractable abutment. Rod 15b which is parallel to rod 22, is cut in such manner as to constitute holding surface 14 (FIG. 1). The retractable abutment consists of a stop 16a adapted to be maintained against a projection 16b of element 2a or 2b by a screw 16c. In order to disengage stop 16a it suffices to unscrew screw 16c through two or three turns and to pivot stop 16a.

There is further provided a mechanically controlled auxiliary brake including, for instance, levers such as 24 adapted to apply against disc 1 pads such as 20 slidable in cylindrical housings 25 provided in the elements 2a and 2b of frame 2.

The operation of this brake is as follows:

When pads 3 are pressed by pistons 7 against the opposed faces of disc 1, their plates 9 slide along holding surfaces 13 and 14. The braking reaction is transmitted generally to holding surfaces 13 (front drive braking) or exceptionally to holding surfaces 14 (rear drive braking).

In the first case, the braking reaction is applied entirely to holding surfaces 13 without giving rise to a radial component. In the second case, the braking reaction is supported by holding surfaces 14 and it gives rise to a very small radial braking component which is always smaller than the adhesion component on holding surfaces 14. It will be understood that the retractable abutments, or stops 16a are not subjected to the braking reactions and merely serve to hold pads 3 in position.

When pad 3 is worn, stop 16a is retracted by rotation and plate 9 is pivoted about its axis X through an angle just sufficient to enable the bearing surface 12 of the pad to escape from the holding surface 14 of the frame. It is then possible to remove the pad and its rigid plate away from holding surface 13 in a direction substantially tangential with respect to disc 1. A new pad and supporting plate may then be substituted.

It has been found that a good sliding of pad supporting plates 9 during operation requires a rather free mounting of these plates, which does not permit of reducing too much the clearance. Consequently, there is a risk of vibration, not only during operation of the brake but also when it is at rest, every time there is resonance with another element of the vehicle (engine or gear box for instance).

Figure 3:
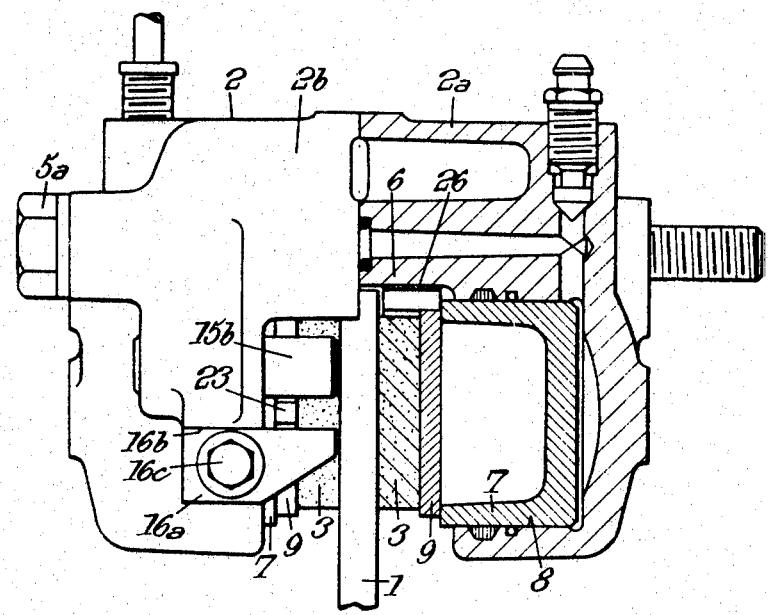
FIG. 3 shows the brake of FIGS. 1 and 2 seen from the left of FIG. 1, with parts in section.

In order to avoid this drawback, according to the present invention, friction element 3, 9 is applied against the holding surface 13 of the frame and against retractable abutment 16a by means of a spring lead 26 of sufficient dimensions (in the direction parallel to the axis of disc 1), as shown by FIG. 3, so as to accommodate displacements of plates 9 due to the wear of pads 3. Advantageously, as shown, said spring 26 bears upon rod 22.

Figure 4:
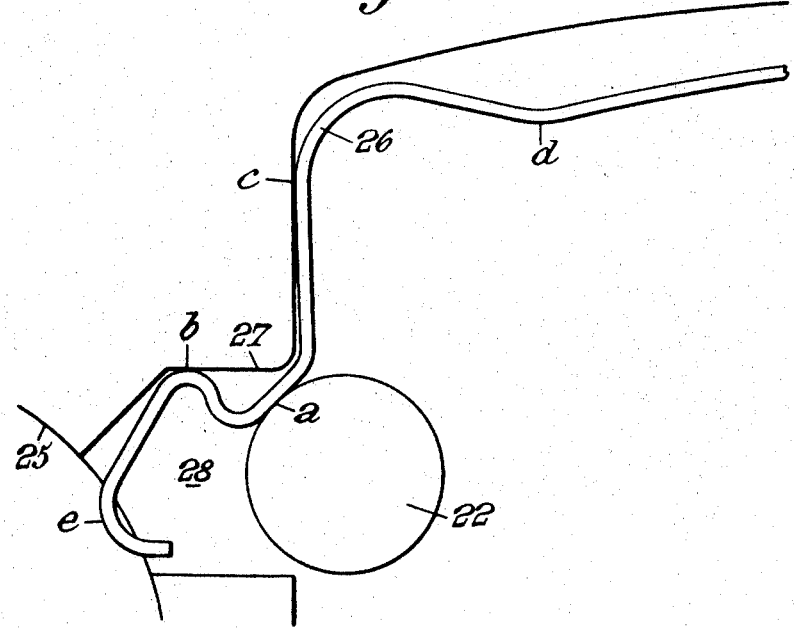
FIG. 4 shows, on an enlarged scale, a detail of FIG. 1, the friction pad having been removed.

As shown by FIG. 4, spring 26 is disposed between rod 22 and transverse wall 27 which, on the one hand, limits the recess of the frame in which friction element 3, 9 is located, and, on the other hand, limits a notch 28 connecting said recess with the housing 25 of the pad 20 of the auxiliary brake. Spring 26 is given a shape such that, on either side of its portion a bearing upon rod 22, it includes two bearing portions b and c in contact with transverse wall 27. Thus spring 26 remains in position even when, as shown by FIG. 4, pads 3 and 20 have been removed. One of the ends of spring 26 is located between the surface 6 of the frame and plate 9 and includes at least one resilient bearing surface d in contact with plate 9 and preferably, as shown, two such surfaces (FIG. 1). Advantageously, as shown, the other end of spring 26 projects beyond notch 28 into housing 25 so as to form a resilient bearing surface e in contact with the pad 20 of the auxiliary brake or with a plate rigid with said pad.

Owing to the resilient force it exerts through its portions d, spring 26 exerts upon plate 9 a small force perpendicular to the plane passing through the axis of rod 22 and through the bearing face of stop 16a, which prevents vibrations of the pad of the main brake without interferring with its sliding displacements parallel to the axis of the disc. Furthermore, by exerting a resilient thrust through its bearing portion e upon auxiliary brake pad 20 (or upon the plate thereof), spring 26 also prevents vibrations of the friction element of the auxiliary brake without interfering with its sliding displacements. It will be noted that, due to its being supported at three points a, b and c, spring 26 is held in position even when one of the pads 3 and 20 is removed for being replaced.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. A disc brake which comprises, in combination,
a disc rotatable about an axis perpendicular thereto and passing through the center thereof,
a stationary brake frame disposed astride a portion of the periphery of said disc,
two friction structures parallel to said disc and located on opposed sides thereof opposite each other, said friction structures being carried by said brake frame, at least one of said friction structures being movable with respect to said frame in a direction parallel to said axis to permit relative movement of said friction structures toward each other parallel to said axis to clamp said disc tightly between them,
each of said friction structures including two cylindrical bearing surfaces the generatrices of which are parallel to said axis and the respective directrices of which are circular arcs having a common center,
said frame including cylindrical holding surfaces of the same shape as said bearing surfaces, respectively, and adapted to cooperate therewith, for holding said friction structures during clamping of said disc by said friction structures,
said frame further including at least one retractable abutment adapted to prevent pivoting of said friction structures about an axis parallel to said disc axis and passing through said last mentioned center, in such manner that, once said abutment is retracted, said friction structures can be disengaged from said frame by a pivoting about said second mentioned axis followed by a sliding in a direction parallel to said disc,
and a spring leaf, interposed between said stationary brake frame and the friction structure movable with respect to said frame in a direction parallel to said axis, to keep said last mentioned friction structure applied against a retractable abutment and one of said holding surfaces despite wear of the last mentioned friction structure,
said spring leaf making contact with said frame at three different points, and bearing under stress against said frame at said three points, said three-point bearing contact being adapted, by itself, to hold said spring in place even in the absence of said last-mentioned friction structure.

2. A disc brake according to claim 1 wherein each of said friction structures is provided with a concave bearing surface and a convex bearing surface, the holding surfaces of said frame having corresponding shapes, respectively, and a cylindrical rod being carried by said brake frame perpedicular to said disc, the cylindrical surface of said rod constituting the convex holding surface, said spring leaf bearing against said rod, the point of contact of said spring with said rod being disposed between the other two points of contact, said spring bearing in opposition against, on the one hand said rod, and on the other hand said two other points of contact.

3. A disc brake according to claim 1 further comprising an auxiliary brake having friction structures parallel to said first mentioned friction structures, said spring leaf bearing upon said auxiliary brake friction structures.

References Cited

UNITED STATES PATENTS 3,285,371   11/1966   Cadiou _____ 188—73

FOREIGN PATENTS 1,330,418   5/1963   France.
707,013   4/1954   Great Britain.

FERGUS S. MIDDLETON, *Primary Examiner.*
G. E. A. HALVOSA, *Assistant Examiner.*